No. 618,811. Patented Jan. 31, 1899.
D. C. BYMASTER.
ICE CREAM FREEZER.
(Application filed July 28, 1898.)
(No Model.)
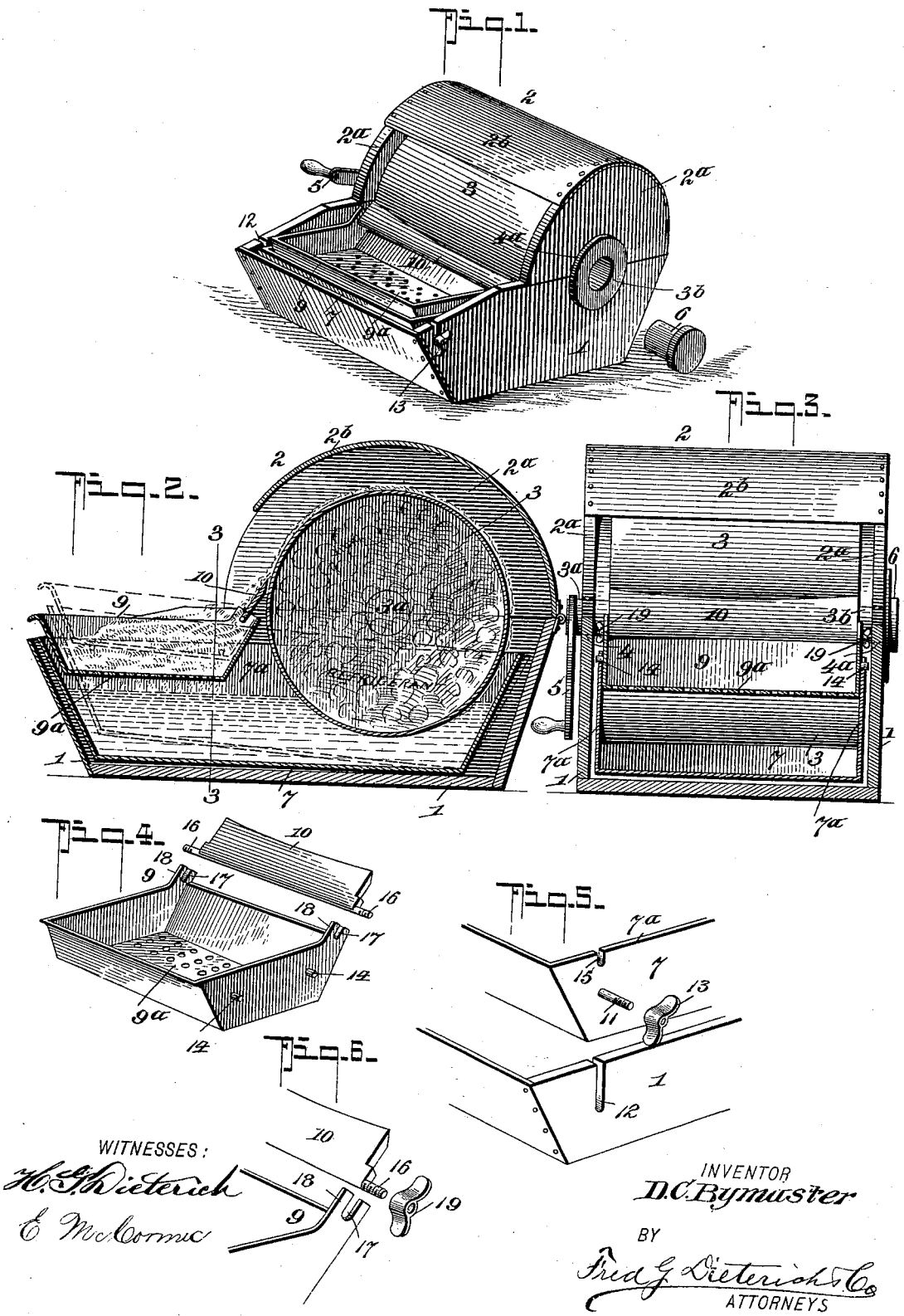
WITNESSES:
INVENTOR
D. C. Bymaster
BY
Fred G. Dieterich & Co.
ATTORNEYS

UNITED STATES PATENT OFFICE.

DAVID C. BYMASTER, OF HOOPLE, NORTH DAKOTA.

ICE-CREAM FREEZER.

SPECIFICATION forming part of Letters Patent No. 618,811, dated January 31, 1899.

Application filed July 28, 1898. Serial No. 687,155. (No model.)

*To all whom it may concern:*

Be it known that I, DAVID C. BYMASTER, residing at Hoople, in the county of Walsh and State of North Dakota, have invented certain new and useful Improvements in Ice-Cream Freezers, of which the following is a specification.

This invention relates to improvements in that class of ice-cream freezers having a rotary freezing-cylinder upon the surface of which the cream is frozen and from which it is removed as the cylinder revolves by a suitable scraper; and said invention primarily has for its object to provide a freezer of this character of a very simple and economical construction which can be easily manipulated and which will effectively serve for its intended purpose.

This invention also comprehends a construction of parts embodying an adjustable and removable cream-holder, a supplemental holder for collecting the frozen cream, having a foraminated bottom carrying an adjustable scraper or knife, also removable, said supplemental bottom being so combined with the main cream-holder that the melted cream will drop back into the said main holder to be again frozen, the several parts being so arranged that they can almost instantly be separated for cleaning without removing screws, bolts, or other fastening means.

The invention therefore consists in the detail combination and specific arrangement of parts, such as will be first described, and then set out in the appended claims, reference being had to the accompanying drawings, in which—

Figure 1 is a perspective view of my improved freezer. Fig. 2 is a vertical longitudinal section of the same. Fig. 3 is a transverse section taken on the line 3 3 of Fig. 2. Fig. 4 is a detail view of the cream-pans and the scraper devices separated, and Figs. 5 and 6 are detail views hereinafter particularly referred to.

The framing of my improved freezer is made in two sections, the lower, 1, and an upper one, 2, which extends transversely over one end of the lower frame-section only and is hinged thereto to swing rearward. The upper or top section consists of the semicircular ends $2^a$ and the cover-plate $2^b$, which extends from the lower rear edge of the ends $2^a$ to a point a little forward of the top, whereby to leave the front of such top open for a purpose hereinafter explained.

3 indicates the sheet-metal cylinder, having trunnions $3^a$ $3^b$ at the opposite ends, which are adapted to seat in the bearings formed by the semicircular seats 4 $4^a$ in the adjacent horizontal edges of the top and bottom portions, respectively. To the trunnion $3^a$ is secured a crank-handle 5, and the opposite trunnion $3^b$ is made hollow to provide a feed-entrance for the salt and ice or other freezing material, said entrance during the operation of the machine being held closed by a suitable plug 6.

By referring now more particularly to Fig. 2 it will be noticed that the forward end of the bottom section is made trough-like and extends beyond the cylinder sufficient to admit of the ready insertion or removal of the sheet-metal cream-holding pan 7, of a width to snugly fit the sides of the frame-trough and of a length to extend under the cylinder 3, which cylinder is of a slightly less width than the cream-pan 7 to permit the sides $7^a$ of such pan to extend over the ends of the cylinder.

The pan 7, which may seat on the bottom of the frame, is preferably suspended on such frame for vertical adjustment, whereby it can readily be set and brought closer to the cylinder when the quantity of cream to be used becomes exhausted, and therefore admit of the dipping of the same amount of cylinder-surface into the pan when the cream is low as when high. The pan 7 is provided at opposite sides with laterally-disposed threaded stems or studs 11, which extend through substantially vertical slots 12 of the pan 1, and the threaded portions of the stems or studs receive thumb-nuts 13, which engage the sides of the pan 1 and secure the pan 7 at the desired adjustment. To admit of such adjustment, setting devices such as shown in Fig. 5 may be employed, it being obvious that by loosening or tightening the thumb-nuts 13 the pan can be held high or low in the frame or bottom trough, as conditions may make necessary.

The frozen-cream holder is in the nature of a supplemental pan 9, which is detachably supported over the inner end of the pan 7 in any suitable manner—as, for example, by providing its sides with lateral studs 14 to fit grooves 15 in the top edges of the lower pan—and such pan 9 has a foraminated bottom 9ª, as shown.

10 indicates a concaved knife or scraper adjustably held for close contact with the face of the cylinder. The knife or scraper preferably is adjustably and detachably held in the front end of the pan 9, as clearly shown in Fig. 6, whereby it is removable with the pan detachably therefrom and capable of being set to scrape a thicker or thinner shaving of frozen cream, as may be desired.

The knife or scraper 10 is provided at its ends with threaded pivots or pintles 16, arranged in slots 17 of projecting portions 18 of the inner end of the pan 9, and receiving thumb-nuts 19, which retain the knife or scraper at the desired adjustment.

From the foregoing description, taken in connection with the drawings, it will be noticed that the main frame has a forwardly-extending trough portion, into which the cream-holding pan 7 can be quickly and conveniently set and adjusted relatively to the cylinder.

By providing a supplemental pan for collecting the frozen cream as it is scraped off the cylinder with the perforated bottom and supporting such pan within the main pan waste of material is avoided, as any melted cream will drop back into the main pan. The cream is thus subjected to a more continuous contact with the cylinder and is consequently better frozen and the more solid than if the melted particles were allowed to remain in the collecting-pan.

In using my machine the cylinder is set in place on the lower frame and the hinged frame closed over, the front of such frame being left open to allow for the easy deflecting of the cream-shaving from the cylinder to the pan 9. The refrigerant having been placed into the cylinder and the cream in the pan 7 and such pan properly adjusted, the cylinder is turned in the direction indicated by the arrow in Fig. 2, the cream being taken up by the cylinder in its rotation and frozen as it engages the cylinder, it being obvious that at the start should the cylinder be not sufficiently cold to freeze the cream solid such cream as is in a semifrozen state will pass into the pan 9 and back into the pan 7, avoiding thereby any possible waste. Again, when the cream in the pan 7 is nearly used up such pan can be elevated somewhat to submerge a greater area of freezing-surface on the cylinder than would be possible if the pan and cylinder had a fixed relation.

By constructing the several parts as before described the same may be easily detached from the frame and each other in order to properly cleanse and dry them.

While it is preferred to use ice and salt as a refrigerant, it is manifest other well-known refrigerants may be employed to effect the same purpose.

Having thus described my invention, what I claim, and desire to secure by Letters Patent, is—

1. An ice-cream freezer, comprising in combination; a rotary refrigerant holder or cylinder and frame therefor; a cream-pan supported thereon and extending under the cylinder; a frozen-cream-collecting pan having a foraminated bottom supported over the cream-pan, and a scraper, as set forth.

2. In an ice-cream freezer, the combination with a supporting-frame having a forwardly-extending trough-like portion and a hinged top; a refrigerant-holding cylinder mounted in such frame under the hinged top; a cream-holding pan detachably held on the frame; a supplemental pan having a foraminated bottom detachably supported on the main pan, and a scraper adjustably supported on the supplemental pan, all being arranged substantially as shown and for the purposes described.

3. The hereinbefore-described ice-cream freezer, comprising a supporting-frame having a forwardly-extending trough-like portion and a hinged top; a refrigerant-holding cylinder detachably journaled on such frame under the hinged top, said cylinder having an end opening for the reception of the refrigerant; a cream-pan detachably held in the trough-like portion of the main frame and having vertical adjustment, said frame extending under the cylinder and having its sides lapping the ends of such cylinder; a supplemental pan detachably supported on the main pan and having a foraminated bottom; and a scraper-knife supported on the front end of the supplemental pan and having adjustment in the direction of the cylinder, all being arranged substantially as shown and described.

DAVID C. BYMASTER.

Witnesses:
W. C. FRANCIS,
MARY A. FRANCIS.